United States Patent Office 3,520,837
Patented July 21, 1970

3,520,837
METHOD OF MAKING A POLYIMIDE FOAM
Glenn R. Wilson, Dayton, Ohio, assignor to Monsanto Research Corporation, St. Louis, Mo., a corporation of Delaware
No Drawing. Filed Nov. 9, 1967, Ser. No. 681,931
Int. Cl. C08g 53/08, 51/24
U.S. Cl. 260—2.5
7 Claims

ABSTRACT OF THE DISCLOSURE

A method for making a polyimide foam from a tetracarboxylic acid-ditertiary amine reaction product and an aromatic diamine in an aqueous solution.

CROSS-REFERENCE TO RELATED APPLICATION

The polyimide-forming reaction mixture used herein is disclosed in application Ser. No. 681,878 filed of even date.

BACKGROUND OF THE INVENTION

According to the invention, there is provided a new and valuable method for preparing polyimide foams. Polyimide foams are generally well-known in the art. See e.g., U.S. Pats. 3,249,561 issued May 3, 1966 to E. I. du Pont de Nemours and Company, and 2,867,609 issued Jan. 6, 1959 to E. I. du Pont de Nemours and Company. They are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, and two carboxy groups of the tetracarboxylic component which have not reacted with the organic amine component. Upon heating, cyclization occurs by reaction of the unreacted carboxylic group at the amide portion of the polymer to give an imide structure. Thus, condensation of, say, 1,2,4,5-benzenetetracarboxylic dianhydride and p-phenylenediamine to give a prepolymer amide-acid and curing of the latter to a polyimide proceeds substantially as follows:

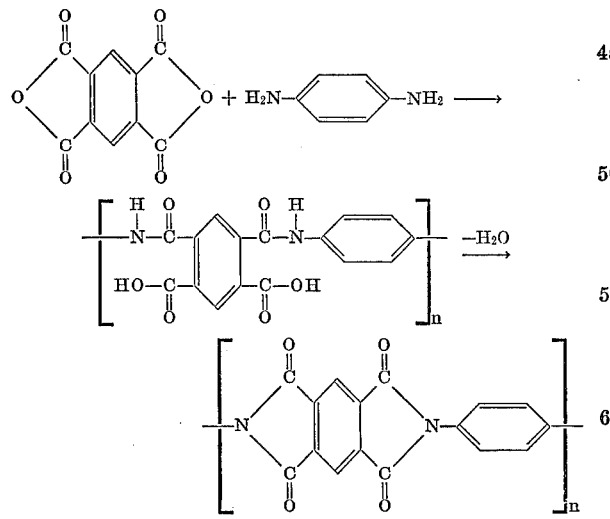

where $n$ denotes the degree of polymerization.

Because curing of the polyamide/acid gives the exceptionally stable polyimides, the prepolymers are of great potential interest for the preparation of heat- and solvent-resistant foams. In such applications, curable materials are generally most expediently employed in solution. However, the usual prior art polyamide/acids possess limited solubility; hence, in order to employ them in these fields, it has been necessary to use such uncommon, expensive solvents as N-methylpyrrolidinone, dimethylformamide, dimethylacetamide, dimethyl sulfoxide, etc. A further limitation on the wide applicability of the polyamide/acids is the noxious nature of such solvents.

The present invention overcomes these and other problems.

SUMMARY

This invention relates to an improvement in the method of making a polyimide foam which comprises heating at a temperature of from about 150° C. to about 500° C. for 0.5 to 2 hours at a pressure not to exceed one atmosphere an aqueous heat-reactive polyimide-forming reaction mixture comprising: (1) the reaction product consisting essentially of the product obtained by reacting approximately one mole of a tetracarboxylic acid of the formula

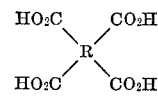

wherein R represents a tetravalent radical selected from the group consisting of

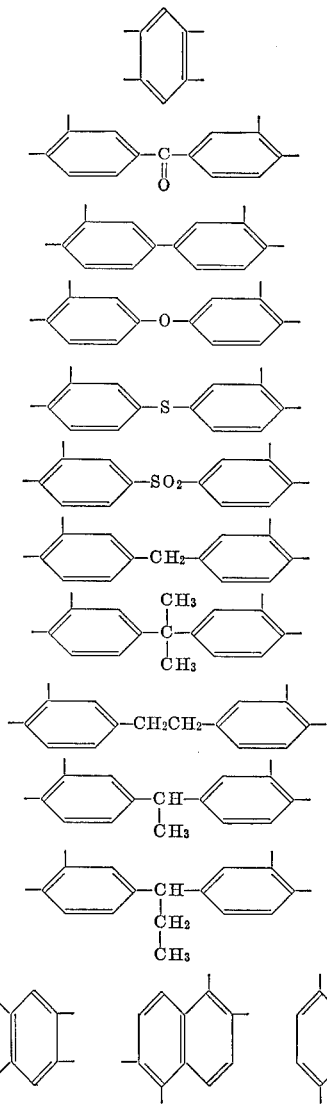

with approximately two moles of a tertiary amine having a base strength ($K_b$ in water) of $1 \times 10^{-3}$ to $1 \times 10^{-10}$ and a boiling point below 200° C. together with (II) a diamine of the formula

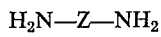

wherein Z is an aromatic hydrocarbon radical having from 6 to 18 carbon atoms, said diamine having at least one carbon atom between each amino group and being present in the amount of approximately one mole for each mole of the tetracarboxylic acid-ditertiary amine reaction product and (III) water in the amount of 20% to 60% by weight of the said reaction mixture.

The improvement of the invention over the older methods of preparing polyimide foams lies in the use of water as a solvent for the polyimide-forming reaction mixture. This is accomplished by forming the reaction product of a tetracarboxylic acid in an aqueous solution using a tertiary amine. After solution of the acid-amine reaction product has been achieved, an aromatic primary diamine is added to the solution. The polyimide-forming reaction mixture may then be stored at room temperature or lower for an indefinite period of time, or polymerization may be presently effected to produce a foam by heating the solution to about 500° C., preferably to 315° C. for 0.5 to 2 hours.

Although the mechanism by which polymerization takes place is not fully known, it is believed that upon heating, the acid-amine reaction product undergoes a change to the dianhydride and, upon further heating, the dianhydride reacts with the primary diamine to form the polyimide foam. Thus, condensation of, say, the dipyridinium reaction product of 1,2,4,5-benzenetetracarboxylic acid in water and m-phenylenediamine to give the tetracarboxylic dianhydride and curing of the latter with the diamine to a polyimide proceeds substantially as follows:

I

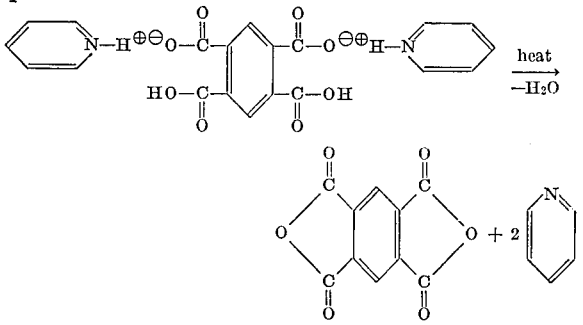

II

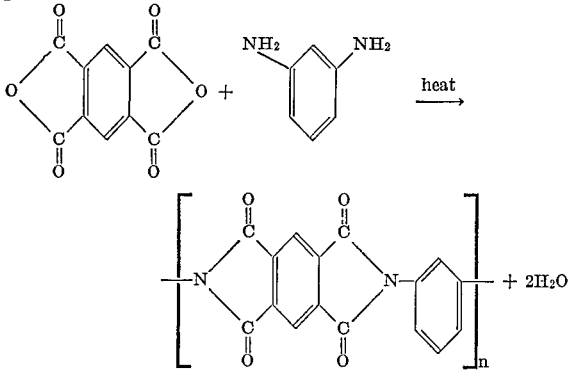

where $n$ denotes the degree of polymerization.

The absence of polyamic acid in the final composition is determined by infrared absorption spectra. The spectra of the present compositions are characterized by absorption at 5.6 microns, indicating an imide linkage, and at 5.8 microns due to the C=O bond of the carboxyl groups. The absence of absorption bands representing N—H and C=O bonds of the amide groups indicates full conversion of the reactants to the polyimide polymer.

The preferred tertiary amines having a boiling point below 200° C. so that they may be substantially removed from the reaction mixture before polymerization is complete. The base strength ($K_b$ in water) of the tertiary amines used herein lies in the range of $1 \times 10^{-3}$ to $1 \times 10^{-10}$. If the base strength is greater than $1 \times 10^{-3}$, the ionic strength of the acid-amine reaction product may be such as to prevent the formation of the dianhydride from the acid. Conversely, if the base strength is less than $1 \times 10^{-10}$, the tertiary amine will not be strong enough to react with the acid, and therefore solution of the acid in water cannot be achieved. Examples of the useful tertiary amines, together with their base strengths ($K_b$ in water at 20°–25° C.) and boiling points are: trimethylamine ($5.5 \times 10^{-4}$, 4° C.); triethylamine ($5.7 \times 10^{-4}$, 90° C.); tripropylamine ($4.4 \times 10^{-4}$, 156° C.); triisobutylamine ($2.6 \times 10^{-4}$, 192° C.); methyldiethylamine ($2.7 \times 10^{-4}$, 63°–65° C.); dimethylethylamine ($9.8 \times 10^{-5}$, 38° C.); dimethylpropylamine ($1.4 \times 10^{-4}$, 65°–66° C.); dimethylbutylamine ($1.1 \times 10^{-4}$, 94°–96° C.); dimethylisobutylamine ($1.2 \times 10^{-4}$, 80°–81° C.); tert-butyldimethylamine ($4.1 \times 10^{-4}$, 89°–90° C.); methyldiisopropylamine ($1.1 \times 10^{-3}$, 109°–112° C.); 1,2-bis-(dimethylamino)ethane ($9 \times 10^{-6}$, 20° C.); 1,2-bis(dimethylamino)propane ($3 \times 10^{-5}$, 135°–140° C.); 1,3-bis(dimethylamino)butane ($1 \times 10^{-4}$, 165° C.); pyridine ($2.3 \times 10^{-9}$, 115° C.); 2-methylpyridine ($1.5 \times 10^{-9}$, 128° C.); 3-methylpyridine ($4.8 \times 10^{-9}$, 144° C.); 4-methylpyridine ($1.1 \times 10^{-8}$, 143° C.); 2,4-dimethylpyridine ($5.2 \times 10^{-8}$, 157° C.); 2,6-dimethylpyridine ($4.9 \times 10^{-8}$, 143° C.); 3,4-dimethylpyridine ($3.3 \times 10^{-8}$, 163° C.); 2-ethylpyridine ($9.7 \times 10^{-9}$, 149° C.); 4-ethylpyridine ($1.1 \times 10^{-8}$, 166° C.); 2-methyl-5-ethylpyridine ($3.2 \times 10^{-8}$, 174° C.); dimethylaminoethanol ($1.4 \times 10^{-5}$, 135° C.); diethylaminoethanol ($5 \times 10^{-5}$, 163° C.); diisopropylaminoethanol ($8.2 \times 10^{-5}$, 187°–192° C.), etc.

Examples of useful acids are: 1,2,4,5-benzenetetracarboxylic acid; 3,3',4,4'-biphenyltetracarboxylic acid; 3,3',4,4'-benzophenonetetracarboxylic acid; bis(3,4-dicarboxylicphenyl)methane; 1,2 - bis(3,4 - dicarboxylicphenyl)ethane; 1,1 - bis(3,4 - dicarboxylicphenyl)ethane; 2,2-bis-(3,4 - dicarboxylicphenyl)propane; 1,1-bis(3,4-dicarboxylicphenyl)propane; bis(3,4 - dicarboxylicphenyl)ether; bis(3,4 - dicarboxylicphenyl)sulfide; bis(3,4-dicarboxylicphenyl)sulfone; 3,3',4,4' - biphenyltetracarboxylic acid; 2,3,6,7-naphthalenetetracarboxylic acid; 1,2,5,6-naphthalenetetracarboxylic acid; 1,4,5,8-naphthalenetetracarboxylic acid, etc. The dianhydrides of the tetracarboxylic acids may also be employed, for when the dianhydride is added to the water, and the mixture heated the tetracarboxylic acid is formed.

Any aromatic primary diamine having 6 to 18 carbon atoms may be used, provided that there is at least one carbon atom between the amino groups.

Examples of such diamines are: m-phenylenediamine; p-phenylenediamine; 2,7-naphthalenediamine; 3,6-naphthalenediamine; bis(3-aminophenyl)methane; bis(4-aminophenyl)butane; 2,7-anthracenediamine; 3,6-anthracenediamine; p-terphenyl-4,4'''-diamine; p-terphenyl-5,3'''-diamine, etc.

In order to achieve solution of the tetracarboxylic acid in water (i.e., from the acid-amine reaction product), it is necessary that there be present 2 moles of the tertiary amine for every mole of the acid. Although this amount of the tertiary amine reacts with only 2 of the 4 carboxy groups, it has been found that this ratio of amine to acid is sufficient to completely dissolve the acid so long as the total composition contains between 20% to 60% by weight water.

The reaction product of the tetracarboxylic acid and the tertiary amine and the aromatic primary diamine are advantageously employed in equal stoichiometric proportions, i.e., one mole of the acid-amine reaction product per mole of the diamine. However, a slight excess of either component may be used.

The presently provided foams vary in density and texture according to the type of tertiary amine employed. For example, by heating at 315° C. under 1 atmosphere pressure for 45 minutes 1 mole of benzophenonetetracarboxylic acid, 2 moles of pyridine, 1 mole of m-phenylenediamine and sufficient water to yield 65% solids, there is obtained a tough hard foam having a density of 2.25 lb./ft.$^3$. Replacement of the pyridine by an equivalent amount of N,N-dimethylaminoethanol and heating under the same conditions produces a very resilient foam (95% recovery of the 25% compression) having a density of 1.10 lb./ft.$^3$.

For preparation of shaped articles, the liquid composition is simply poured into a mold and heated. Depending on the density and cell-size desired, heating may be done gradually or abruptly. Thus, the mold with its liquid contents may be placed into an oven which has been preheated to the polyimide-forming temperature, say, 315° C. and maintained at that temperature until expansion has ceased. Or the mold with its contents may be first heated at a temperature sufficient only to volatilize off the water and then heated to about 500° C., and preferably about 315° C., to form the foamed polyimide.

The invention thus provides strong, foamed structures of any size or shape. The presently provided foamed polyimides are flameproof and highly resistant to heat; they are thus particularly valuable as insulating materials and for this purpose they may be provided in sheet or shredded form. The low density, toughness and heat-stability of the foamed structures recommend them for use in any application where a combination of these properties is desired, e.g., fire walls in automotive vehicles, furnace insulation, roof, wall and ceiling insulation, steam pipes, etc.

Accordingly, an object of this invention is the provision of improved starting materials for the preparation of polyimide foams. Another object is the provision of water as the solvent for the polyimide foam-forming reaction mixture. It is still a further object to provide improved polyimide foams.

DESCRIPTION OF THE PREFERRED EMBODIMENTS

The invention is further illustrated by, but not limited to the following examples:

EXAMPLE 1

To a hot mixture of 15.8 g. of pyridine (0.2 mole) and 33.6 g. water, 35.6 g. of benzophenonetetracarboxylic acid (0.1 mole) was added. After solution was achieved by stirring, 10.8 g. of m-phenylenediamine (0.1 mole) was added. There resulted a slightly viscous solution. A portion of this solution (65.4 g.) was transferred to an aluminum dish and placed in an oven at 315° C., for 45 minutes. There resulted a very tough foam, density=2.25 lb./ft.$^3$.

EXAMPLE 2

To prepare a resilent foam, 71.6 g. of benzophenonetetracarboxylic acid (0.2 mole) was added to a mixture of 35.7 g. of N,N-dimethylaminoethanol (0.4 mole) and 69.4 g. of water. The mixture was stirred, and a small exotherm noted. Then 21.6 g. of m-phenylenediamine (0.2 mole) was added to the mixture. To produce a foam, 65.4 g. of the solution was transferred to an aluminum dish and placed in an oven at 315° C. for 45 minutes. Two 1″ x 2″ x 2″ samples (A and B) were cut from the foam for density and compressive strength measurements with the following results:

| Specimen: | Density, lb./ft.$^3$ | Compressive strength, p.s.i. | Percentage compression |
|---|---|---|---|
| A | 1.10 | 16.0 | 25 |
| B | 1.23 | 19.5 | 25 |

Both A and B showed excellent recovery after compression.

It is to be understood that although the invention has been described with specific reference to particular embodiments thereof, it is not to be so limited since changes and alterations therein may be made which are within the full intended scope of this invention as defined by the appended claims.

What I claim is:

1. A method for making a polyimide foam which comprises heating at a temperature of from about 150° C. to about 500° C. for 0.5 to 2 hours at a pressure not to exceed one atmosphere an aqueous heat-reactive polyimide-forming reaction mixture comprising:

(I) the reaction product consisting essentially of the product obtained by reacting approximately one mole of a tetracarboxylic acid of the formula

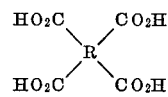

wherein R represents a tetravalent radical selected from the group consisting of

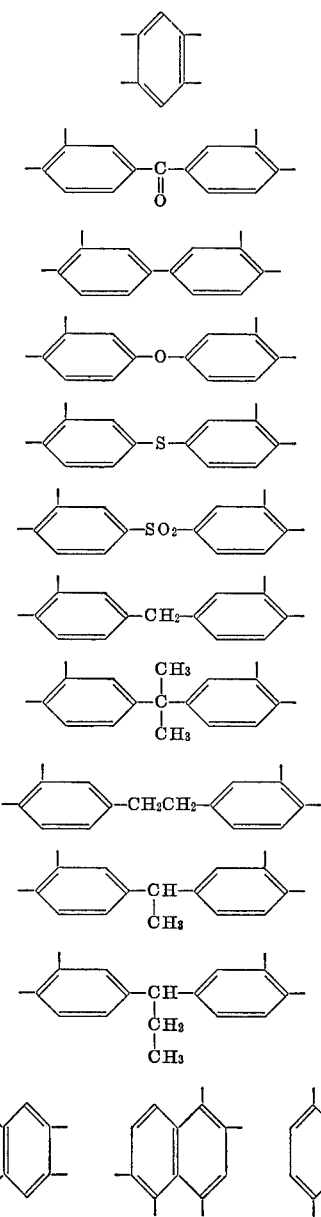

with approximately two moles of a tertiary amine having a base strength ($K_b$ in water) of $1 \times 10^{-3}$ to $1 \times 10^{-10}$ and a boiling point below 200° C. together with (II) a diamine of the formula $$H_2N-Z-NH_2$$

wherein Z is an aromatic hydrocarbon radical having from 6 to 18 carbon atoms, said diamine having at least one carbon atom between each amino group and being present in the amount of approximately one mole for each mole of the tetracarboxylic acid-ditertiary amine reaction product, and (III) water in the amount of 20% to 60% by weight of the said reaction mixture.

2. The method defined in claim 1, wherein R is

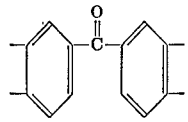

3. The method defined in claim 1, where Z is phenylene.
4. The method defined in claim 1, wherein R is

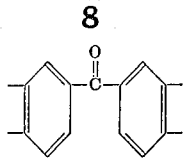

and Z is phenylene.

5. The method of claim 1, where the tertiary amine is pyridine.
6. The method of claim 1, where the tertiary amine is trimethylamine.
7. The method of claim 1, where the tertiary amine is trimethylamine.

References Cited

UNITED STATES PATENTS

| | | | |
|---|---|---|---|
| 3,242,136 | 3/1966 | Endrey | 260—29.2 |
| 3,440,197 | 4/1969 | Boldebuck et al. | 260—29.2 |
| 3,448,068 | 6/1969 | Holub et al. | 260—29.2 |

JOHN C. BLEUTGE, Primary Examiner

U.S. Cl. X.R.

260—29.2, 47, 65, 78